(12) United States Patent  
Ikeda (10) Patent No.: US 8,179,442 B2
(45) Date of Patent: May 15, 2012

(54) IMAGING DEVICE AND METHOD FOR PERFORMING SURVEILLANCE BY INFRARED RADIATION MEASUREMENT

(75) Inventor: Yukio Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1341 days.

(21) Appl. No.: 11/389,089

(22) Filed: Mar. 27, 2006

(65) Prior Publication Data

US 2006/0268112 A1 Nov. 30, 2006

(30) Foreign Application Priority Data

May 26, 2005 (JP) ................................ 2005-154446

(51) Int. Cl.
*H04N 5/33* (2006.01)
*H04N 5/228* (2006.01)
(52) U.S. Cl. ..................................... 348/164; 348/208.1
(58) Field of Classification Search .................. 348/164, 348/154, 152, 208.1, 208.14, 211.3, 211.13
See application file for complete search history.

(56) References Cited

U.S. PATENT DOCUMENTS

| 5,528,290 | A | * | 6/1996 | Saund ......................... 348/218.1 |
| 5,589,901 | A | * | 12/1996 | Means ............................. 396/12 |
| 5,646,405 | A | * | 7/1997 | Nevel et al. ................. 250/341.6 |
| 6,049,363 | A | * | 4/2000 | Courtney et al. ............. 348/700 |
| 6,304,284 | B1 | * | 10/2001 | Dunton et al. .................. 348/36 |
| 7,292,261 | B1 | * | 11/2007 | Teo ................................. 348/36 |
| 2003/0025599 | A1 | * | 2/2003 | Monroe ......................... 340/531 |
| 2003/0137593 | A1 | * | 7/2003 | Watanabe et al. ............. 348/274 |
| 2005/0041103 | A1 | * | 2/2005 | Kinjo ......................... 348/207.1 |
| 2005/0128584 | A1 | * | 6/2005 | Shulman et al. ............... 359/462 |
| 2005/0157173 | A1 | * | 7/2005 | Kurebayashi et al. ... 348/207.11 |
| 2007/0091124 | A1 | * | 4/2007 | Hasegawa et al. ............. 345/629 |
| 2008/0211908 | A1 | * | 9/2008 | Dvir et al. ...................... 348/143 |
| 2009/0278914 | A1 | * | 11/2009 | Koyanagi et al. ............... 348/39 |
| 2010/0058397 | A1 | * | 3/2010 | Rogers ............................ 725/60 |

FOREIGN PATENT DOCUMENTS

| EP | 1 030 519 A2 | 8/2000 |
| JP | 10-108163 | 4/1998 |
| JP | 10-304351 | 11/1998 |
| JP | 2000-243062 | 9/2000 |
| JP | 2002-305742 | 10/2002 |
| JP | 2003-6659 | 1/2003 |
| JP | 2003-196786 | 7/2003 |
| JP | 2003-324723 | 11/2003 |
| JP | 2004-78297 | 3/2004 |
| JP | 2004-312638 | 11/2004 |
| JP | 2005-78377 | 3/2005 |

* cited by examiner

*Primary Examiner* — Hung Lam
(74) *Attorney, Agent, or Firm* — Oblon, Spivak, McClelland, Maier & Neustadt, L.L.P.

(57) ABSTRACT

It is possible to definitely identify a relative position of a moving subject in an infrared image captured by an infrared camera in a relation with the background of the moving subject. The present invention provides an imaging device including an infrared camera for imaging an area under surveillance by infrared radiation measurement, a moving-subject detector for detecting a moving subject in the surveillance area on the basis of an infrared image signal acquired by the infrared camera, an image signal processor for coloring a moving part of the infrared image signal, detected by the moving-subject detector, with a predetermined color, and an image display for displaying an image resulted from the coloring of the moving part of the infrared image signal by the image signal processor.

7 Claims, 9 Drawing Sheets

IMAGING DEVICE AND METHOD FOR PERFORMING SURVEILLANCE BY INFRARED RADIATION MEASUREMENT

CROSS REFERENCES TO RELATED APPLICATIONS

The present invention contains subject matter related to Japanese Patent Application JP 2005-154446 filed in the Japanese Patent Office on May 26, 2005, the entire content of which is incorporated herein by reference.

BACKGROUND OF THE INVENTION

1. Field of the Invention

The present invention relates to an imaging device and method, computer program product on a computer-readable medium and an imaging system, for surveillance of a wide-range scene by means of a panoramic image obtained by imaging with sequential shifting of the imaging direction.

2. Description of the Related Art

In the electronic still cameras having been used widely in the past, light having passed through a lens by releasing the shutter of the camera to image an object can be converted into an image signal by a solid-state image sensor such as CCD (charge-coupled device) and the image signal be recorded to a recording medium. The image signal once recorded can be read out of the recording medium for reproduction. Many of the electronic still cameras have a monitor capable of displaying a captured still image and on which a selected one of the still images having so far been recorded in the recording medium can be displayed. In the electronic still camera, an image signal supplied to the monitor corresponds to an object per screen. For this reason, each of the images displayed simultaneously on the monitor is limited in size and thus cannot be used for simultaneous surveillance of any wide-range scene.

On this account, there have been more and more prevailing surveillance cameras permitting surveillance of a wide-range scene by imaging an object with sequential shifting of the imaging direction to produce a panoramic image formed from a plurality of unit images. Recently, there have been proposed a technique of shrinking/synthesizing a plurality of video signals to produce a video signal of one frame (as in the Japanese Patent Application Laid Open No. 108163 of 1998) and also a centralized surveillance/recording system capable of collecting surveillance video signals from a plurality of existing surveillance video cameras and recording the signals to a recording medium such as video tape for the purpose of surveillance (as in the Japanese Patent Application Laid Open No. 2000-243062).

SUMMARY OF THE INVENTION

Note here that to detect some change in an imaging range while watching surveillance images recorded in a recording medium such as video tape as above, the observer should watch a surveillance image supplied at each scan in detail. The observer has to always be careful not to overlook even a small change of the image under observation, appearance of a very small object, etc., which requires too much labor and time. Further, since the surveillance/monitoring system depends on the observer's eyes, he or she may possibly fail to find such changes of a scene.

For making surveillance of such an area at night, the observer should be very careful not to fail in finding any intruder in a dark image captured by the camera under insufficient light. Especially, in case the range of a scene under surveillance is wider, it is extremely difficult to find such an intruder.

Furthermore, since the image captured by the camera at night is so dark itself that it is not possible to know details of an intrusion, that is, from which part of which building a person has entered the off-limits area or through which route the intruder has moved. The wider the range of a scene under surveillance, the more difficult it is to know the above details.

Also, video information captured by an infrared camera capable of imaging an object irrespective of the illuminance of the object is converted into a monochromatic (W/B) image for outputting to outside. So, in case an object poor in variation of shape and temperature distribution is imaged, it is difficult in many cases to verify a target and scene around the target.

Also, it has been proposed to display a monochromatic (W/B) image obtained with the infrared camera and colored according to the thermal distribution of the entire image. However, since the coloring is made in artificial colors over the image, the colored image is inferior in visibility.

Therefore, the conventional technique of displaying an image acquired with an infrared camera through such coloring is not advantageous in that changes in the infrared image of an object are not easy to detect.

It is therefore desirable to overcome the above-mentioned drawbacks of the related art by providing an imaging device and method, capable of making night-and-day surveillance of a specific object such as persons in a relation with its background, computer program product on a computer-readable medium allowing a computer to control the operation of an imaging device in imaging by the imaging method, and an imaging system.

According to the present invention, there is provided an imaging device including:

an infrared imaging means for imaging an area under surveillance by infrared radiation measurement;

a moving-subject detecting means for detecting a moving subject in the surveillance area on the basis of an infrared image signal acquired by the infrared imaging means;

an image signal processing means for coloring a moving part of the infrared image signal, detected by the moving-subject detecting means, with a predetermined color; and an image displaying means for displaying an image resulted from the coloring of the moving part of the infrared image signal by the image signal processing means.

According to the present invention, there is also provided an imaging method including the steps of:

imaging an area under surveillance by infrared radiation measurement;

detecting a moving subject in the surveillance area on the basis of an infrared image signal acquired in the infrared imaging step;

coloring a moving part of the infrared image signal, detected in the moving-subject detecting step, with a predetermined color; and displaying an image resulted from the coloring of the moving part of the infrared image signal in the image signal processing step.

According to the present invention, there is also provided a computer program product on a computer-readable medium, the computer program product allowing a computer to execute an imaging controlling process including the steps of:

imaging an area under surveillance by infrared radiation measurement;

detecting a moving subject in the surveillance area on the basis of an infrared image signal acquired in the infrared imaging step;

coloring a moving part of the infrared image signal, detected in the moving-subject detecting step, with a predetermined color; and displaying an image resulted from the coloring of the moving part of the infrared image signal in the image signal processing step.

According to the present invention, there is also provided an imaging system including:

an infrared imaging device for imaging an area under surveillance by infrared radiation measurement; and a controller for controlling the operations of the operations of the infrared imaging device via a network, the controller including:

a moving-subject detecting means for detecting a moving subject in the surveillance area on the basis of an infrared image signal acquired by the infrared imaging means;

an image signal processing means for coloring a moving part of the infrared image signal, detected by the moving-subject detecting means, with a predetermined color; and an image displaying means for displaying an image resulted from the coloring of the moving part of the infrared image signal by the image signal processing means.

According to the present invention, a moving subject in a surveillance area is detected based on an infrared image signal acquired by imaging the area by infrared radiation measurement, a moving part of the infrared image signal is colored with a predetermined color and an image resulted from the coloring of the moving part of the infrared image signal is displayed. Thus, a moving subject included in an infrared image of the surveillance area can be displayed in the color day and night and hence the moving subject in the surveillance area can also definitely be identified in a relation with its background. Also, since any slight movement of a person can be detected without fail, the present invention provides a higher-accuracy surveillance.

DETAILED DESCRIPTION OF THE PREFERRED EMBODIMENTS

The present invention will be described in detail below concerning embodiments thereof with reference to the accompanying drawings.

Figure 1:
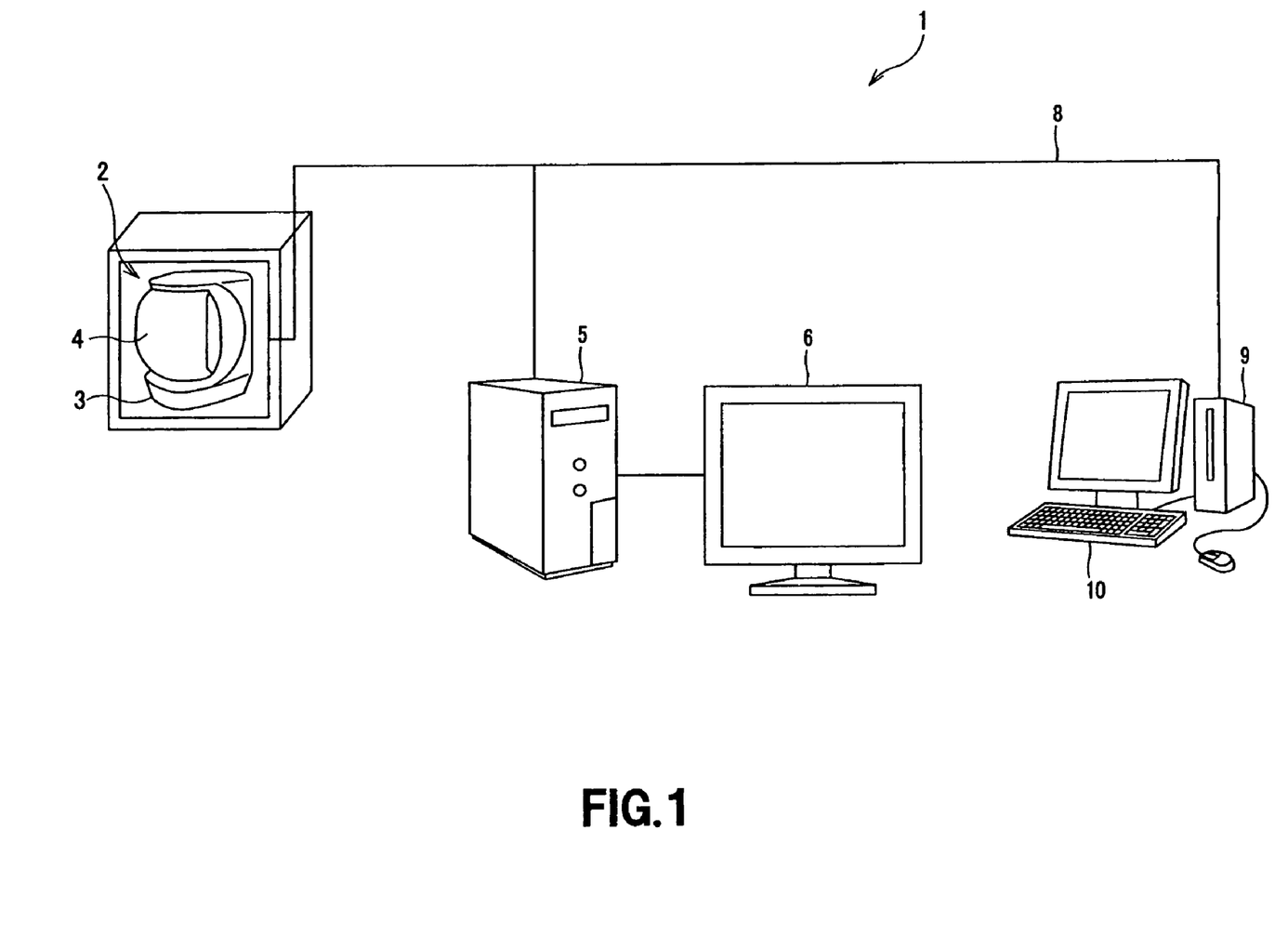
FIG. 1 illustrates the construction of the surveillance/monitoring system according to the present invention.

The present invention is applied to a surveillance/monitoring system 1 constructed as shown in FIG. 1, for example.

The surveillance/monitoring system 1 includes an infrared camera 2 to image an area under surveillance, monitor 5 supplied with an infrared image signal from the infrared camera 2, display 6 connected to the monitor 5, terminal unit 9 used by a plurality of users to execute their applications, terminal display 10 connected to the terminal unit 9, and a network 8 to make two-way communications among the infrared camera 2, monitor 5 and terminal unit 9.

Of the surveillance/monitoring system 1, the infrared camera 2 is an integration of a pan/tilter 3 and camera block 4. The pan/tilter 3 is formed as a rotating platform that can be turned about tilting and panning axes, for example, to freely shift the imaging direction.

The camera unit 4 is installed on the pan/tilter 3 as the rotating platform to image an object while having its imaging direction shifted horizontally or vertically under the control of the monitor 5. Also, the camera block 4 images the object with its power being increased or decreased as the angle of view is changed under the control of the monitor 5. By providing a plurality of camera blocks 4 for one monitor 5, it is possible to image an object with the camera units at different angles of view, respectively, and thus obtain image information from multiple points of view.

The monitor 5 is composed of electronic devices such as a personal computer etc. It records image signals transmitted from the infrared camera 2 and displays a recorded image signals on the display 6. Also, when the a desired portion or point of an image is designated by the user, the monitor 5 selects an optimum one of recorded image signals and controls the display 6 to display the designated image portion or point. The monitor 5 plays a roll of a so-called central controller to control the entire network 8 and sends an image to a terminal unit 9 upon request from the latter. It should be noted that the monitor 5 is constructed as will be described in detail later.

The network 8 is a public communications network capable of two-way communications of information such as the Internet connected to the monitor 5 via a telephone network, ISDN (Integrated Services Digital Network)/B-ISDN (broadband-ISDN) connected to a TA/modem or the like. It should be noted that in case the surveillance/monitoring system 1 is used in a fixed narrow area, the network 8 may be formed from a LAN (local area network). Also, the network 8 may be formed from a so-called optical fiber communications network. Further, the network 8 may be designed to send MPEG images as well as still images. In this case, MPEG data will continuously be sent from one channel and still image data will be sent at constant time intervals from another channel, according to the Internet Protocol (IP).

The terminal unit 9 is a personal computer (PC) by which the user in each home or business office acquires images from the monitor 5 via the network 8 to execute a desired processing of such image data. By connecting a plurality of terminal units 9 to the network 8, applications for the surveillance/monitoring system 1 can simultaneously be provided to the plurality of users. The terminal unit 9 displays images acquired from the monitor 5 on the terminal display 10. Also, the terminal unit 9 generates a request signal in response to a command entered by the user and sends the signal to the monitor 5. It should be noted that the block configuration of the terminal unit 9 is similar to that of the monitor 5 which will be described later, and will not be explained.

Figure 2:
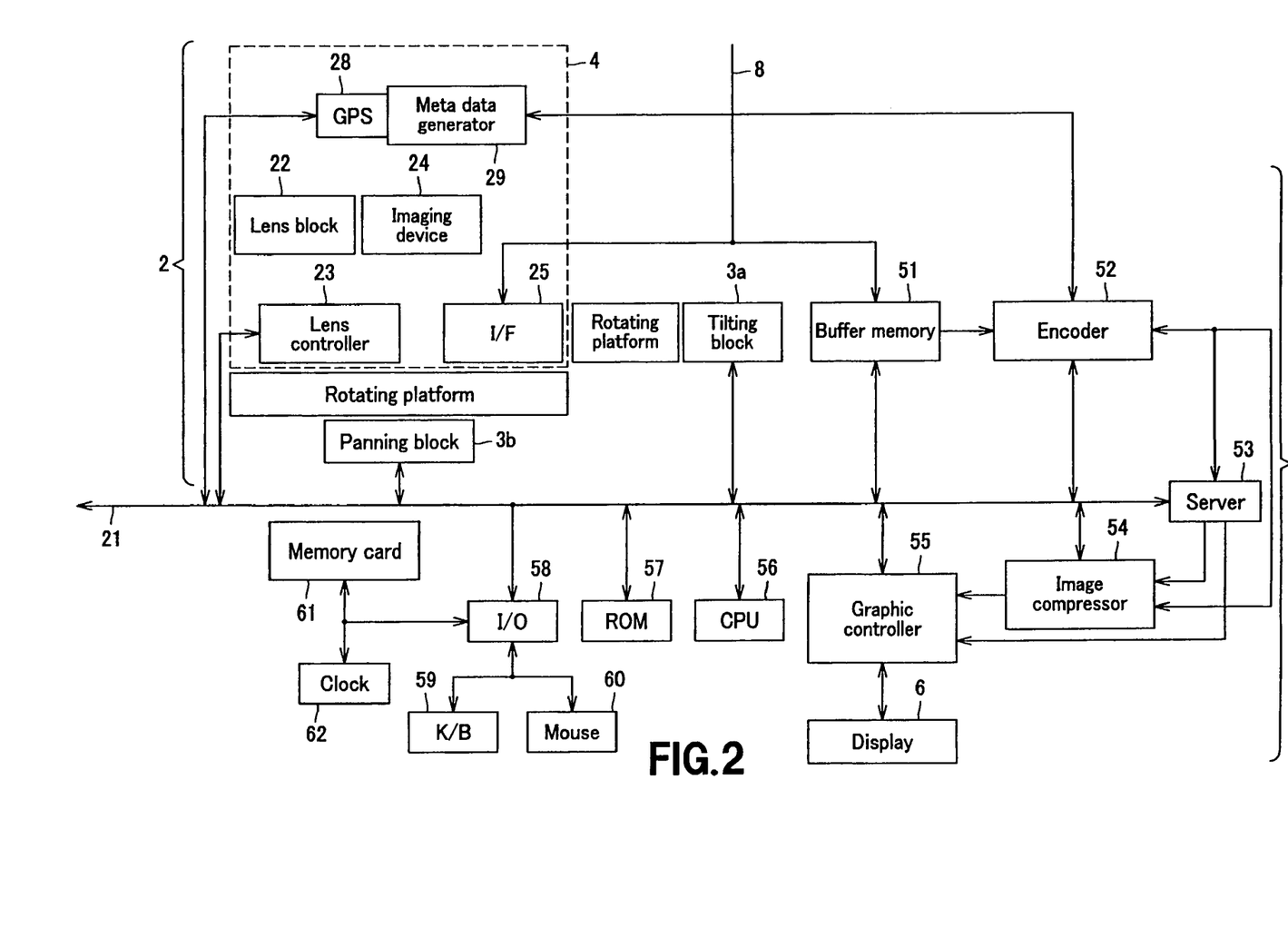
FIG. 2 is a schematic block diagram of a camera unit and monitor.

Next, there will be illustrated and described each of the components of the surveillance/monitoring system 1 according to the present invention with reference to FIG. 2.

As shown in FIG. 2, the infrared camera 2 and monitor 5 are connected to a common controller bus 21.

The pan/tilter 3 included in the infrared camera 2 includes a tilting block 3a and panning block 3b for changing the imaging direction. The infrared camera 2 includes a camera block 4. The camera block 4 includes mainly a lens controller 23 to change the angle of view of a lens block 22, imaging device 24 disposed in a position in which it is perpendicular to the optical axis of the lens block 22, IEEE (Institute of Electric and Electronics Engineers) 1394 interface 25 for sending image signals generated by the imaging device 24 to an image input/output unit 13, GPS (Global Positioning System) receiver 28 to detect a present position of the infrared camera 2, and a meta data generator 29 provided in the GPS receiver 28. It should be noted that the IEEE 1394 interface 25 may be replaced with the Ethernet (registered trademark).

The monitor 5 includes a buffer memory 51 connected to the 1394 interface 25, encoder 52 connected to the buffer memory 51, server 53, image compressor 54 to compress an image read from the server 53, graphic controller 55 connected to the server 53 and image compressor 54 to produce an image for display on the display 6, CPU 56 for controlling each component via the controller bus 21, and a memory card 61 and clock 62, connected to an I/O port 58, respectively.

The monitor 5 further includes a keyboard 59 and mouse 60 for use by the user to designate a desired image area and position in an image displayed on the display 6.

In each of the tilting block 3a and panning block 3b, a stepping motor designed as a driving source for the rotating platform is driven to rotate according to a drive signal supplied from the CPU 56. Thus, the imaging direction of the camera block 4 placed on the rotating platform can be changed horizontally or vertically.

The lens controller 23 controls the lens block 22 for automatic aperture control and focus control according to a drive signal supplied from the CPU 56. Also, the lens controller 23 changes the viewing angle in relation to an object according to such a drive signal. Thus, the camera unit 4 can also image the object with the magnification being sequentially adjusted.

The imaging device 24 includes a thermal camera or IRCCD image sensor for sensing infrared radiation emitted from the surface of a human body, for example. It forms, in an image plane, an object image incident through the lens block 22 to generate an infrared image signal, and sends the signal to the IEEE 1394 interface 25.

Note here that the infrared camera 2 uses a so-called thermography to acquire a so-called thermal image, that is, an infrared image depicting the temperature distribution of a human body. In the infrared camera 2, infrared radiation emitted from the human body are detected by the imaging unit 24, the intensities of the detected infrared radiation are converted into corresponding electric signals, the electric signals are amplified to predetermined levels, respectively, an infrared image signal forming an infrared image is generated.

The GPS receiver 28 is provided to detect a location and imaging direction of the infrared camera 2 according to a signal sent from the GPS system. Especially in case a plurality of infrared cameras 2 is provided, the GPS receiver 28 permits to control the imaging directions of the infrared cameras 2 in conjunction with each other. An output signal from the GPS receiver 28 is supplied to the meta data generator 29 provided to generate positional information including a latitude, longitude, bearing, altitude, etc. based on the results of positioning by the GPS system, and meta data including as time and various parameters. The meta data generator 29 supplies the positional information and meta data to the encoder 52. It should be noted that in the present invention, the above GPS receiver 28 and meta data generator 29 may be omitted.

The buffer memory 51 is controlled under a control signal supplied from the CPU 56 to provisionally store the image signal and infrared image signal supplied from the IEEE 1394 interface 25. The image signal and infrared image signal provisionally stored in the buffer memory 51 are supplied to the encoder 52 where they will be compression-coded according to the standard such as JPEG (Joint Photographic Experts Group). It should be noted that the encoder 52 may be one that adds position information and meta data supplied from the meta data generator 29 to the image signal and infrared image signal to be compression-coded. The encoder 52 outputs the compression-coded image signal and infrared image signal to the server 53 or image compressor 54. It should be noted that in case the supplied image signal and infrared image signal are not to be compression-coded, the encoder 52 will make no compression-coding.

The server 53 image signals and infrared image signals supplied from the encoder 52 one after another in association with positional information and meta data. It should be noted that the server 53 may be replaced with a hard disk or removable disk-shaped recording medium. Image signal recorded in the server 53 is read out to the image compressor 54 and graphic controller 55 under the control of the CPU 56. Also it should be reminded that with the server 53 being controlled by the CPU 56 to deliver infrared image signal recorded therein to the memory card 61, the user can move such captured images to another personal computer (PC). Also, with the server 53 being controlled by the CPU 56 to deliver infrared image signal recorded therein to the aforementioned network server (not shown), the server 53 may be replaced with the network server (not shown).

The image compressor 54 compresses a JPEG-formatted infrared image signal read out of the server 53 into a compressed image or thumbnail image. Also, the image compressor 54 is controlled by the CPU 56 to read an image from the server 53 and generates a moving image. It should be noted that the compression of image data into such a moving image may be done according to MPEG, Motion-JPEG, Motion-JPEG 2000 or the like.

The graphic controller 55 makes graphic processing for the display 6 according to the infrared image signal read out of the server 53 or infrared image signal supplied from the image processor 54. Also, the graphic controller 55 is controlled by the CPU 56 to control the contrast and brightness on the display 6.

In case the user designates an image area and position by the use of the keyboard 59 or mouse 60, the CPU 56 sends a drive signal for driving the pan/tilter 3 and lens controller 23 and control signal for controlling each component in the monitor 5 via the controller bus 21. Also, supplied with a predetermined request signal from the terminal unit 9, the CPU 56 selects an optimum still image, moving image or various information recorded in the server 53 and controls the latter to send the image or information to the terminal unit 9.

Next, image pickup operation of the surveillance/monitoring system 1 according to the present invention will be described.

Figure 3:
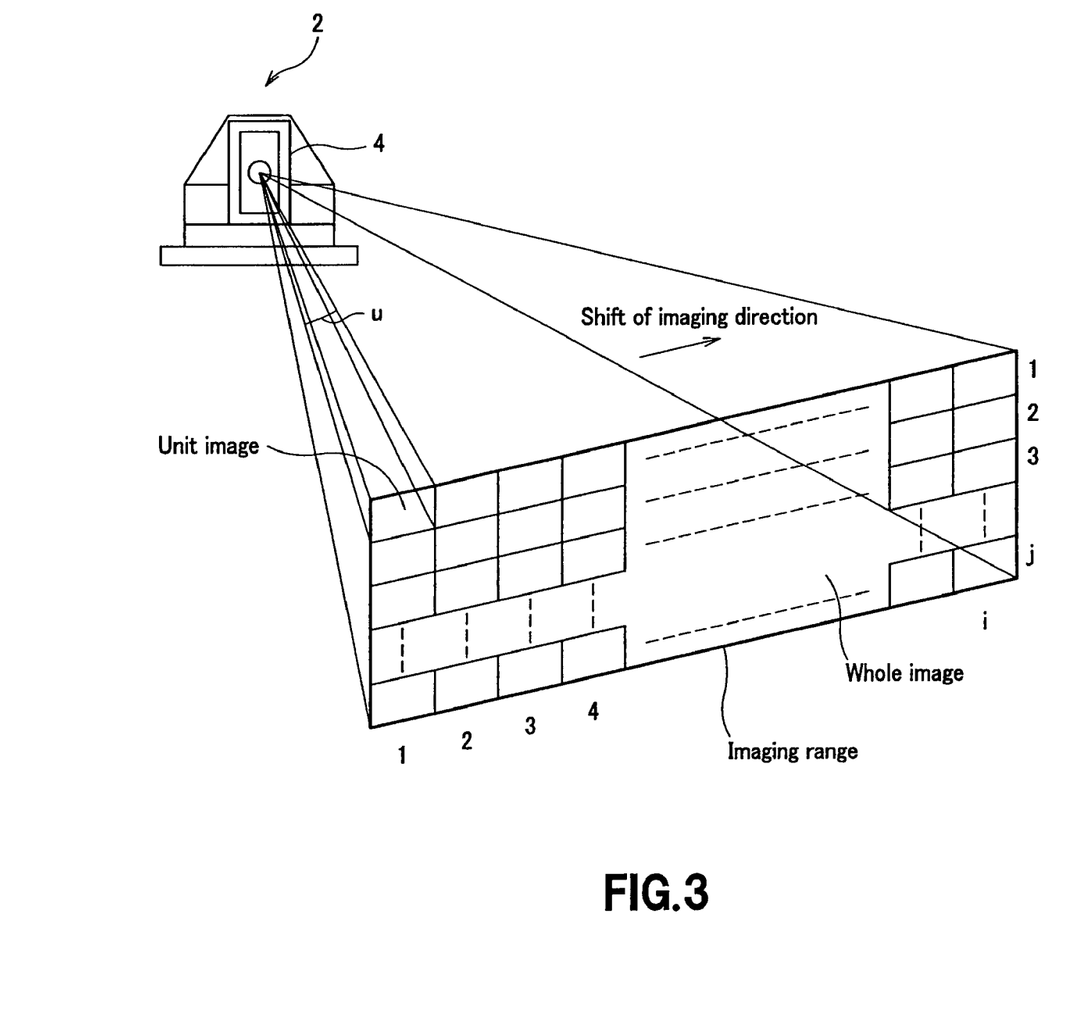
FIG. 3 explains imaging, with the camera unit, of a back-framed viewing range at an angle of view.

As shown in FIG. 3, the infrared camera 2 captures the image a black-framed imaging range at an angle of view u. For covering the entire imaging range at the angle of view u, it is necessary to sequentially shift the imaging direction horizontally or vertically. On the assumption that the size of the imaging range can be represented by i×j times of a size of a frame (will be referred to as "unit image" hereunder)

obtained by imaging at an arbitrary angle of view u, it is necessary to set at least i×j kinds of imaging direction. By overlaying i×j unit images captured at the angle of view u, it is possible to synthesize a total image representing the entire imaging range.

On the assumption that an imaging range includes unit images at coordinates (M, N) in which unit images 1, 2, ..., M, i are laid in this order from the left end of the range along the horizontal coordinate and unit images 1, 2, ..., N, j are laid in this order from the upper end along the vertical coordinate, the CPU 56 sends a drive signal to the tilting block 3a and panning block 3b to set the imaging direction of the camera block 4 first to upper left coordinates (1, 1) for imaging. An image signal based on a unit image generated by capturing the unit image at the coordinates (1, 1) is provisionally stored in the buffer memory 51 and then compression-coded in the encoder 52 according to the JPEG standard. The image signal has positional information indicative of the imaging direction etc. and meta data sent from the GPS 28 and recorded to the server 53.

Similarly, the CPU 56 sends a drive signal to the tilting block 3a and panning block 3b to shift the imaging direction of the camera bock 4 by one frame rightward to coordinates (2, 1) for imaging. An image signal generated by capturing the image at the coordinates (2, 1) is similarly recorded to the server 53. Under the control of the CPU 56, the camera block 4 will make imaging with its imaging direction being sequentially shifted horizontally to coordinates (3, 1), (4, 1), ..., (i, 1).

After completion of imaging along the first row of the imaging range, the camera block 4 will be controlled by the CPU 56 to adjust the imaging direction to coordinates (1, 2) in a second row for imaging, and then sequentially shift the imaging direction horizontally for imaging. Upon completion of imaging up to coordinates (1, j) after repetition of the above operations, the server 53 will have recorded therein images signals which are based on the i×j unit images each captured at each of the coordinates.

Note here that the image signals based on the unit images recorded in the server 53 are read one after another by the image compressor 54 and compressed to fir the size of a display screen of the display 6. The unit images thus compressed are passed through the graphic controller 15 and displayed on the display 6. All the i×j unit images recorded in the server 53 are displayed on the display 6 to synthesize one panoramic whole image (panoramic image). By carrying out the aforementioned imaging operations at regular intervals, it is possible to acquire a whole image depicting the latest scene covered by the imaging range of the camera block 4 and store and manage such whole images in the server 53.

Figure 4:
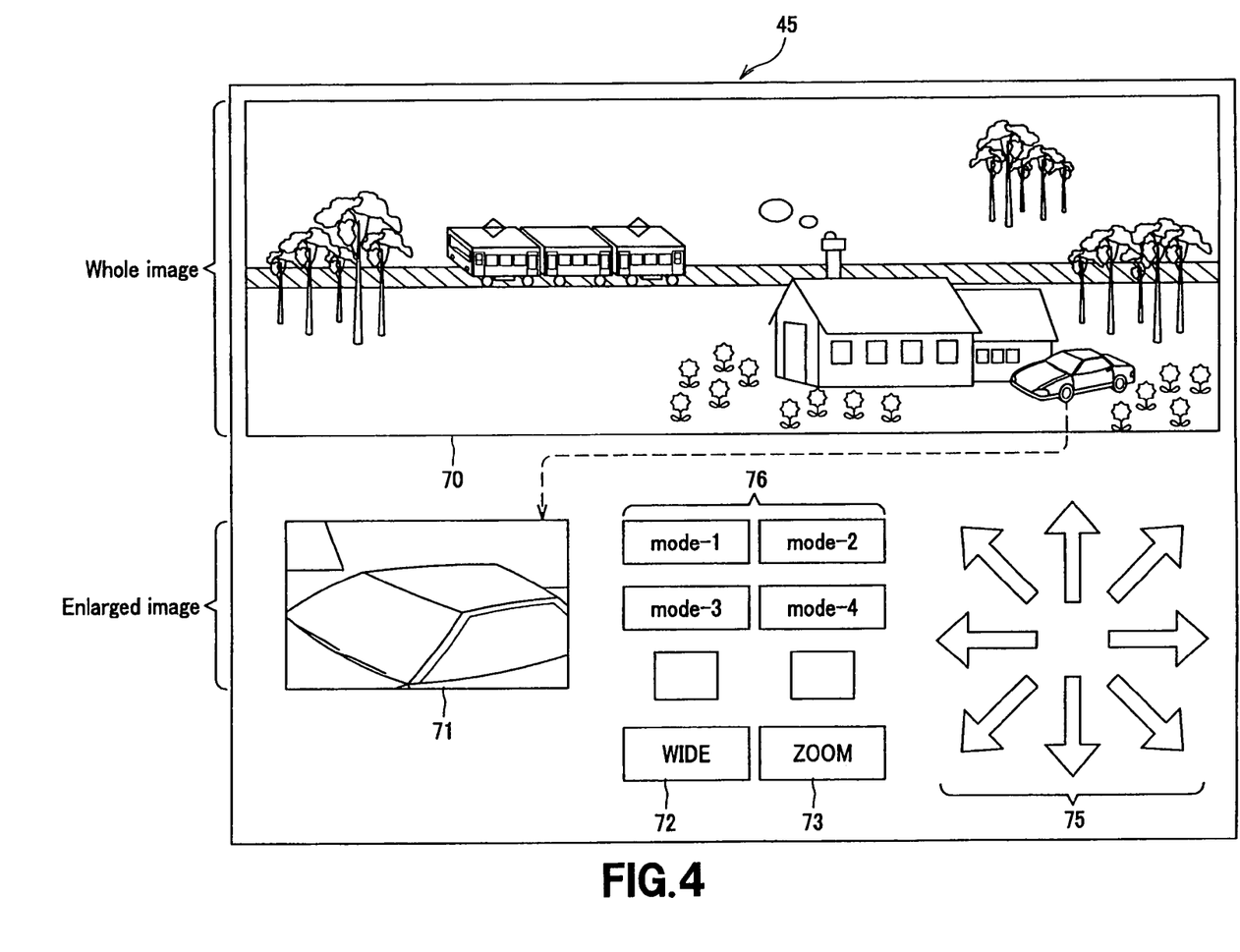
FIG. 4 shows an example of the composition of a viewing area on a display.

FIG. 4 shows an example in which a whole image synthesized by overlaying the i×j unit images captured by the camera block 4 is displayed on a whole-image display area 70 of the display 6. Note that the monitor 5 may be adapted to depict the seam or boundary between unit images forming together the whole image in the whole-image display area 70 or display only a seamless whole image in the display area 70. Also, the monitor 5 may be designed to display, in the whole-image display area 70, one whole image captured at an angle of view at which an entire imaging range in place of the panoramic whole image.

The display 6 has a display screen 45. As shown, the display screen 45 further includes an enlarged-image display area 71 in which a unit image is displayed with an increased scale factor. In this enlarged-image display area 71, there may be displayed a user-designed one of unit images forming together a whole image displayed on the whole-image display area 70 or there may be displayed such user-designated unit images in the sequence of their imaging directions. Thus, the user can check the imaging direction of each of the designated unit images on the real-time basis.

Using the keyboard 59 or mouse 60, the user can designate a desired image area and position in the whole-image display area 70 and enlarged-image display area 71. It should be noted that in each of the display areas 70 and 71, there may also be displayed a crisscross line or pointer for making an operation for the above-mentioned designation synchronously with the movement of the mouse 60 or the like.

Making an operation for entry to the display screen 45 using keys 72, 73, 75 and 76 instead of the mouse 60, it is possible to increase or decrease the scale factor of a unit image displayed in the enlarged-image display area 71, control the imaging direction for horizontal or vertical adjustment of the imaging direction of the camera block 4, and set a desired one of various possible modes.

Also, when designated, an image area where the above person exists can be displayed in a larger scale in the enlarged-image display area 71.

Figure 5:
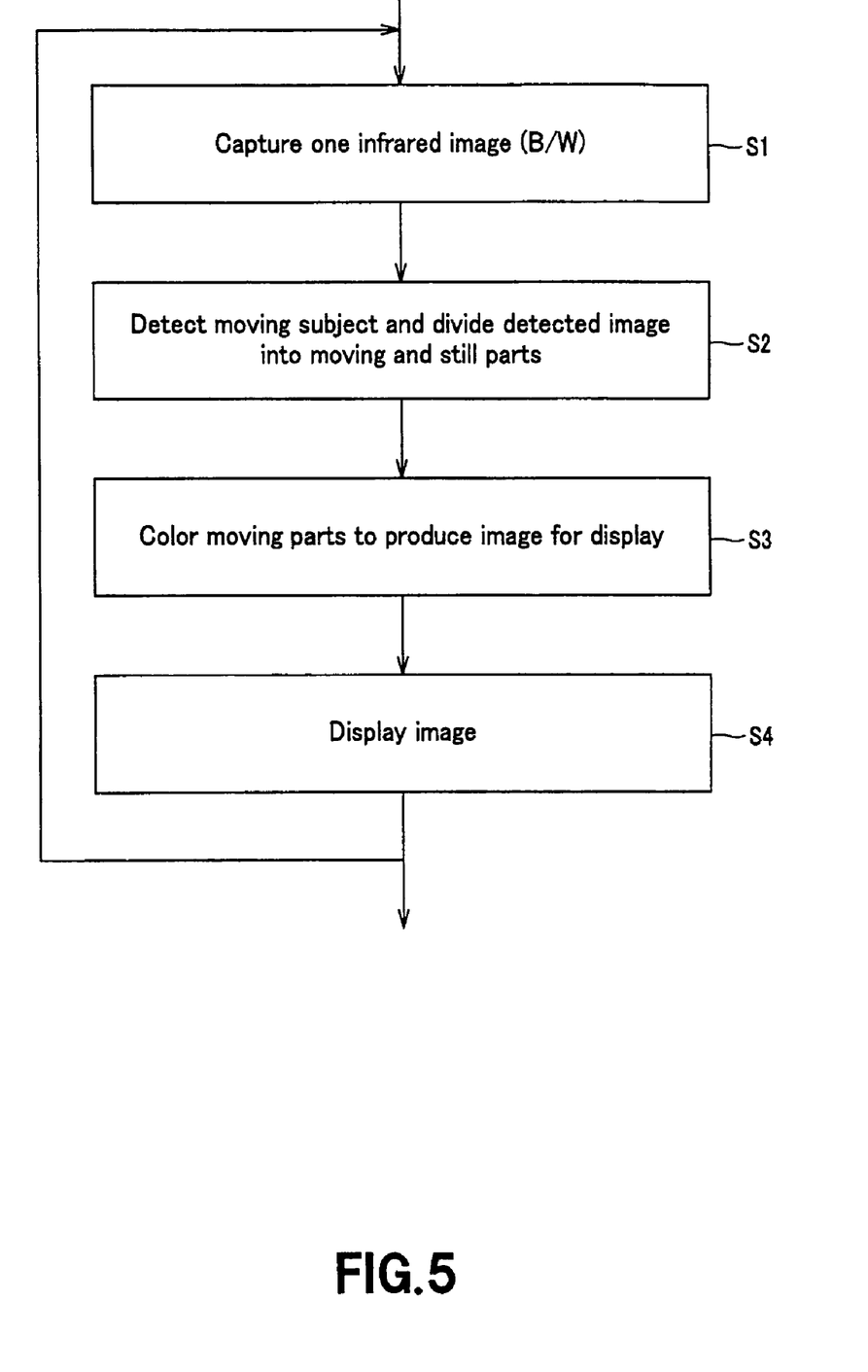
FIG. 5 shows a flow of operations made by the monitor in the surveillance/monitoring system.

In this surveillance/monitoring system 1, the monitor 5 detects a moving subject on the basis of each infrared image of the surveillance area by the infrared camera 2 (in step S1 in FIG. 5), divides the detected image of the moving subject into moving and still parts (in step S2), colors the moving part with a predetermined color to produce an on-screen image from the infrared image signal (in step S3), and displays the image thus produced on the display 6 (in step S4).

Figure 6:
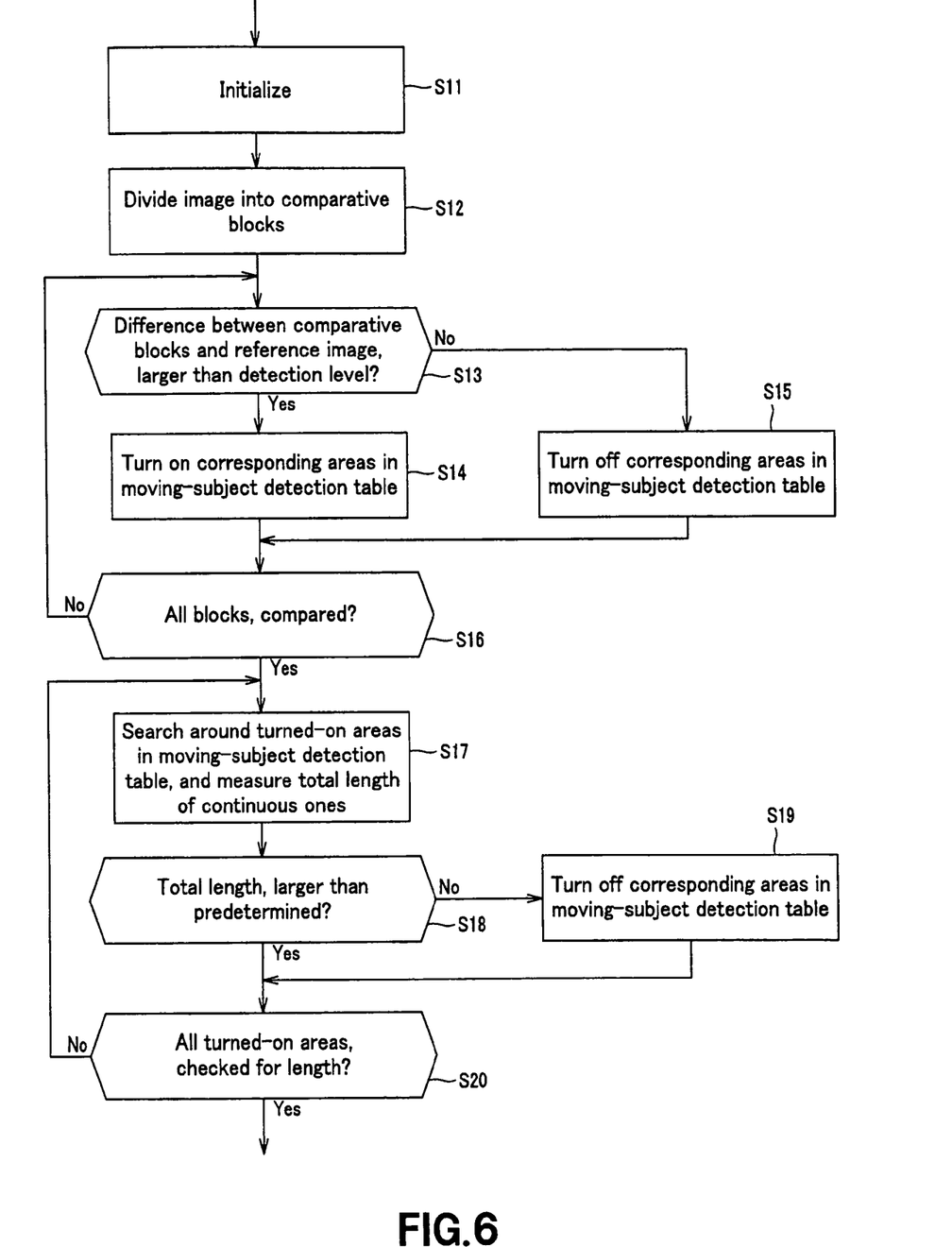
FIG. 6 also shows a flow of operations made by the monitor in detecting a moving subject.
Figure 8:
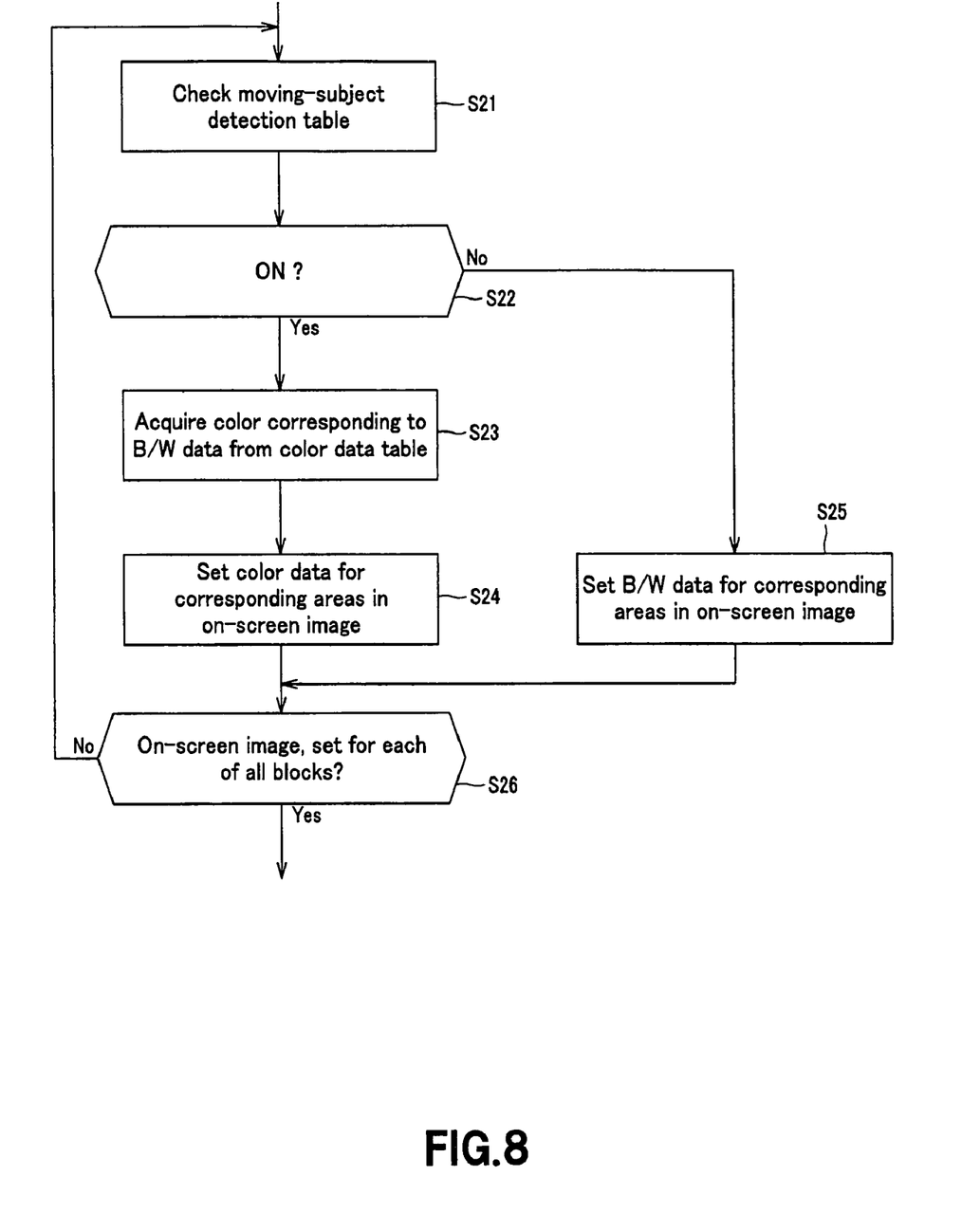
FIG. 8 shows a flow of operations made by the monitor in coloring.

More specifically, in the monitor 5 of the surveillance/monitoring system 1, the CPU 56 makes the sequence of moving-subject detection as in the flow diagram in FIG. 6 and the sequence of coloring as in the flow diagram in FIG. 8 according to a processing program stored in a ROM 57.

In the sequence of moving-subject detection as shown in FIG. 6, number of comparative images, comparative block size, difference detection level, detection area size, etc. are initialized (in step S11), an infrared image formed from the infrared image signal captured by the infrared camera 2 is divided into comparative blocks each from a plurality of pixels (in step S12), and it is judged as to each of the divided blocks whether the difference between the comparative images and a reference image is higher than a predetermined detection level (in step S13). In case the result of judgment is affirmative (Yes), namely, in case the difference between the comparative images and reference image is higher than the predetermined detection level, corresponding areas of a moving-subject detection table MDT are turned on (in step S14). On the contrary, in case the result of judgment in step S13 is negative (No), namely, in case the difference between the comparative images and reference image is not higher than the predetermined detection level, the corresponding areas of the moving-subject detection table MDT are turned off (in step S15).

Next, it is judged whether all the blocks have been subjected to the above comparison (in step S16). In case the result of judgment is negative (No), namely, in case there is any block yet to be compared, the operation returns to step S12 where a next block will be subjected to the above comparison. On the contrary, in case the result of judgment is affirmative (Yes), namely, in case all the blocks have been subjected to the above comparison, search is made around the turned-on areas of the moving-subject detection table MDT and the total length of continuous turned-on areas is measured (in step S17). Based on the result of measurement, it is judged whether the total length of the continuous turned-on areas is larger than predetermined (in step S18).

In case the result of judgment in step S18 is affirmative (Yes), namely, in case the total length of the continuous turned-on areas is larger than predetermined, it is immediately judged whether the total length of all the turned-on areas has been checked (in step S20). Otherwise, in case the result of judgment in step S18 is negative (No), namely, in case the total length of the continuous turned-on areas is not larger than predetermined, the corresponding areas in the moving-subject detection table MDT are turned off (in step S119) before it is judged whether the total length of all the turned-on areas has been checked (in step S20). In case the result of judgment in step S20 is negative (No), namely, in case there remain turned-on areas whose length is to be measured, the operation goes back to step S16 where the total length of the turned-on areas is checked and then the sequence of moving-subject detection is ended. On the contrary, in case the result of judgment in step S20 is affirmative (Yes), the sequence of moving-subject detection is ended immediately.

Figure 7A:
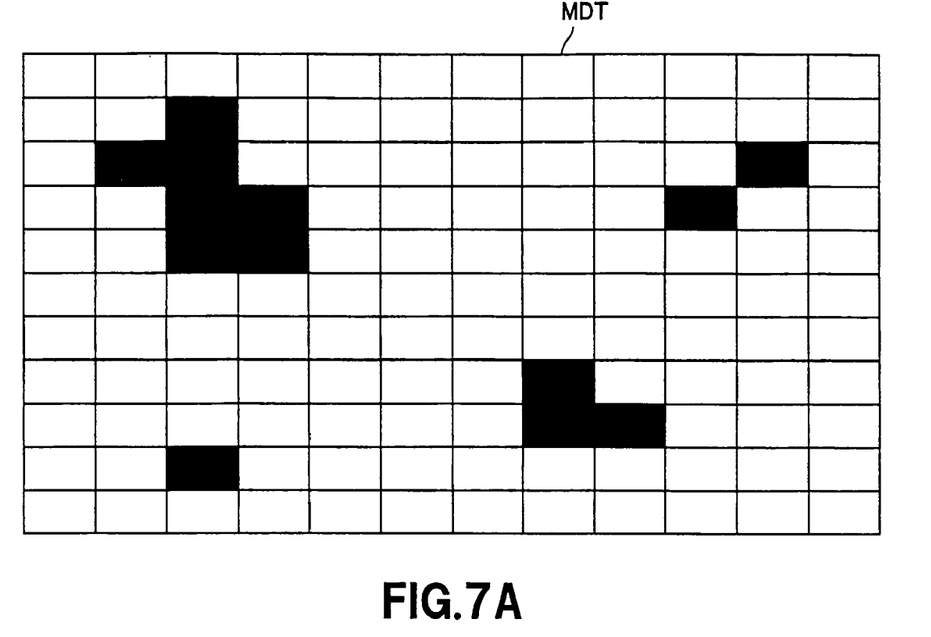
FIG. 7 schematically illustrates the result of moving-subject detection by the monitor.
Figure 7B:
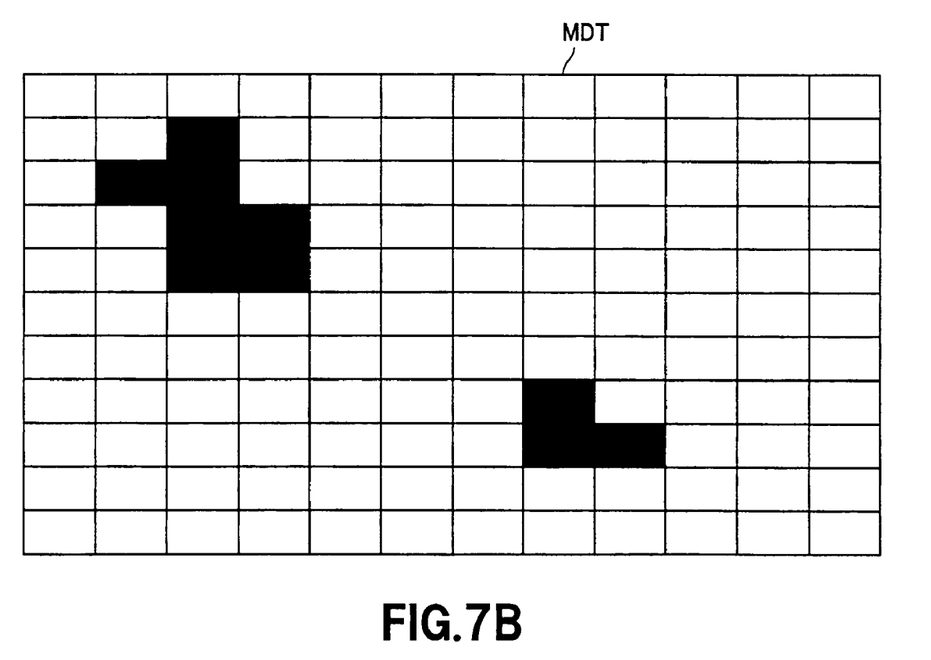

In the sequence of moving-subject detection, the total length of the continuous turned-on areas, indicating a moving subject detected through detection of a difference between the comparative images and reference image as shown in FIG. 7A, for example, is measured to obtain a result of moving-subject detection indicating only a moving-subject portion having a size larger than predetermined as the continuous turned-on areas along a length larger than the predetermined length in the moving-subject detection table MDT as shown in FIG. 7B.

Also in the sequence of coloring as in FIG. 8, the moving-subject detection table MDT is first checked (in step S21) and it is judged whether each block is a turned-on area (in step S22).

Then, in case the result of judgment in step S22 is affirmative (Yes), namely, in case the block is a turned-on area, a color corresponding to a signal level of a part of the infrared image signal, corresponding to the turned-on area, is acquired from a color data table (in step S23) and the color data is set in the corresponding areas of the on-screen image (in step S24).

Also, in case the result of judgment in step S22 is negative (No), namely, in case the block is not any turned-on area, monochromatic (W/B) data corresponding to the signal level of the infrared image signal is set in the corresponding areas of the on-screen image (in step S25).

It is judged in step S26 whether the on-screen image has been set for all the blocks. In case the result of judgment is negative (No), namely, in case there remain any blocks for which the on-screen image has to be set, the operation returns to step S21 where the on-screen image is set for a next block. On the contrary, in case the result of judgment is affirmative (Yes), in case the on-screen image setting has been made for all the blocks, the coloring sequence is ended.

Note that in the color data table, color data can be preset by changing an arbitrary color corresponding to the signal level of a portion of the infrared image signal, corresponding to the turned-on area, for example, a cold color, gradually to a warm color or by representing the arbitrary color by a specific color indicating only an object having a predetermined temperature corresponding to a predetermined signal level.

Figure 9:
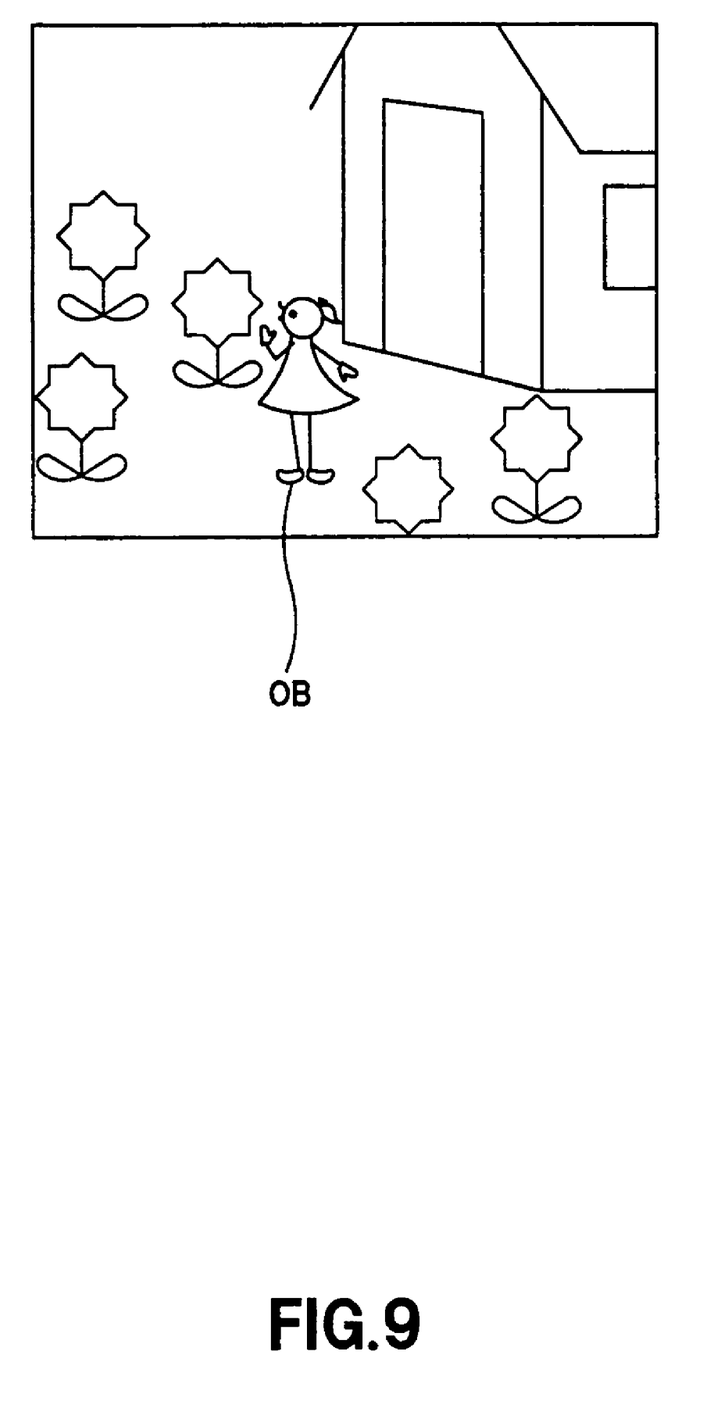
FIG. 9 schematically illustrates an example of colored on-screen image.

In the surveillance/monitoring system 1 according to the present invention, the monitor 5 detects a moving subject in a surveillance area, colors the moving part of an infrared image signal with a predetermined color on the basis of the infrared image signal of the surveillance area, captured by infrared radiation measurement by the infrared camera 2, and displays an image by an infrared image signal resulted from coloring the moving part OB with the predetermined color. Thus, a moving subject included in an infrared image of the surveillance area can be displayed in color day and night as in FIG. 9, so that the moving subject can definitely be identified in the surveillance area in a relation with its background as well. Also, since it is possible to detect any slight movement of a person without fail, the surveillance/monitoring system 1 according to the present invention provides a higher-accuracy surveillance.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   an infrared imaging means for imaging an area under surveillance by infrared radiation measurement;
   a moving-subject detecting means for detecting a moving subject in the surveillance area on the basis of an infrared image signal acquired by the infrared imaging means;
   GPS receiving means for determining a location of the device and an imaging direction of the infrared imaging means;
   an image signal processing means for coloring all moving parts of the infrared image signal, detected by the moving-subject detecting means, with a same predetermined color regardless of the direction of the moving-subject, the image signal processing means coloring non-moving parts based on a signal level of the infrared image signal acquired by the infrared imaging means; and
   an image displaying means for displaying an image resulted from the coloring of the moving parts and the non-moving parts of the infrared image signal by the image signal processing means.

2. An imaging method comprising:
   imaging an area under surveillance by infrared radiation measurement; detecting a moving subject in the surveillance area on the basis of an infrared image signal acquired in the imaging;
   determining a location and an imaging direction of the infrared image signal;
   coloring all moving parts of the infrared image signal, detected in the detecting, with a same predetermined color regardless of the direction of the moving-subject;
   coloring non-moving parts based on a signal level of the infrared image signal; and displaying an image resulted from the coloring of the moving parts of the infrared image signal and the coloring non-moving parts.

3. A non-transitory computer-readable medium which stores a program for causing a computer to perform a method to execute an imaging controlling process, said method comprising:
   imaging an area under surveillance by infrared radiation measurement; detecting a moving subject in the surveillance area on the basis of an infrared image signal acquired in the imaging;
   determining a location and an imaging direction of the infrared image signal; coloring all moving parts of the infrared image signal, detected in the detecting, with a same predetermined color regardless of the direction of the moving-subject;
   coloring non-moving parts based on a signal level of the infrared image signal; and displaying an image resulted from the coloring of the moving parts of the infrared image signal and the coloring non-moving parts.

4. An imaging system comprising: an infrared imaging device for imaging an area under surveillance by infrared radiation measurement, the infrared imaging device including a GPS receiver configured to determine a location and an imaging direction of the infrared imaging device; and a controller for controlling the operations of the operations of the infrared imaging device via a network, the controller including:
- a moving-subject detecting means for detecting a moving subject in the surveillance area on the basis of an infrared image signal acquired by the infrared imaging device;
- an image signal processing means for coloring all moving parts of the infrared image signal, detected by the moving-subject detecting means, with a same predetermined color regardless of the direction of the moving-subject, the image signal processing means coloring non-moving parts based on a signal level of the infrared image signal acquired by the infrared imaging means; and
- an image displaying means for displaying an image resulted from the coloring of the moving parts and the non-moving parts of the infrared image signal by the image signal processing means.

5. An imaging device comprising:
- an infrared camera configured to image an area under surveillance by infrared radiation measurement;
- a moving-subject detector configured to detect a moving subject in the surveillance area on the basis of an infrared image signal acquired by the infrared camera;
- a GPS receiver configured to determine a location of the device and an imaging direction of the infrared camera;
- an image signal processor configured to color all moving parts of the infrared image signal, detected by the moving-subject detector, with a same predetermined color regardless of the direction of the moving-subject, the image signal processor configured to color non-moving parts based on a signal level of the infrared image signal acquired by the infrared camera; and
- an image display configured to display an image resulted from the coloring of the moving parts and the non-moving parts of the infrared image signal by the image signal processor.

6. An imaging system comprising:
- an infrared camera configured to image an area under surveillance by infrared radiation measurement, the infrared camera including a GPS receiver configured to determine a location and an imaging direction of the infrared camera; and
- a controller configured to control the operations of the operations of the infrared camera via a network, the controller including:
- a moving-subject detector configured to detect a moving subject in the surveillance area on the basis of an infrared image signal acquired by the infrared camera;
- an image signal processor configured to color all moving parts of the infrared image signal, detected by the moving-subject detector, with a same predetermined color regardless of the direction of the moving-subject, the image signal processor configured to color non-moving parts based on a signal level of the infrared image signal acquired by the infrared camera; and
- an image display configured to display an image resulted from the coloring of the moving parts and the non-moving parts of the infrared image signal by the image signal processor.

7. The imaging system as claimed in claim 6, wherein the controller pans and tilts the infrared camera to generate a sequence of a plurality of images, and generates a larger image by synthesizing the plurality of images into the larger image.

* * * * *